(12) United States Patent
Cerroni

(10) Patent No.: US 7,772,453 B2
(45) Date of Patent: Aug. 10, 2010

(54) METHOD FOR THE RECYCLING OF MUNICIPAL SOLID WASTES

(75) Inventor: Manlio Cerroni, Rome (IT)

(73) Assignee: Sorain Cecchini Ambiente SCA S.p.A., Rome (IT)

( * ) Notice: Subject to any disclaimer, the term of this patent is extended or adjusted under 35 U.S.C. 154(b) by 552 days.

(21) Appl. No.: 11/629,361

(22) PCT Filed: Jun. 17, 2005

(86) PCT No.: PCT/EP2005/009052

§ 371 (c)(1),
(2), (4) Date: Dec. 12, 2006

(87) PCT Pub. No.: WO2005/123285

PCT Pub. Date: Dec. 29, 2005

(65) Prior Publication Data

US 2008/0006034 A1    Jan. 10, 2008

(30) Foreign Application Priority Data

Jun. 17, 2004    (IT)    .......................... RM2004A0297

(51) Int. Cl.
*A62D 3/38* (2007.01)
(52) U.S. Cl. ...................................... 588/405; 588/320
(58) Field of Classification Search .................. 588/320, 588/405, 408
See application file for complete search history.

(56) References Cited

U.S. PATENT DOCUMENTS

| | | | |
|---|---|---|---|
| 3,527,360 A | 9/1970 | Thielking |
| 4,095,956 A | 6/1978 | Holmes |

FOREIGN PATENT DOCUMENTS

| | | | |
|---|---|---|---|
| CA | 2 347 106 A1 | 11/2002 |
| DE | 43 18 610 A1 | 12/1994 |
| DE | 196 50 103 A1 | 3/1998 |
| EP | 0 661 373 | 7/1995 |
| FR | 2 780 320 A | 12/1999 |
| GB | 1 481 092 A | 7/1977 |

OTHER PUBLICATIONS

Written Opinion of International Application PCT/EP2005/009052.

*Primary Examiner*—Edward M Johnson
(74) *Attorney, Agent, or Firm*—Knobbe, Martens, Olson & Bear LLP

(57) ABSTRACT

The present invention refers to a method and a system for the complete recycling of municipal solid wastes with minimal environmental impact and with the exploitation of the wasted solid recovery fuel (WSRF) for the production of electric energy and/or hydrogen. Those results are achieved by means of the gasification of the WSRF in a reactor where the volatile and the inorganic components are combusted separately thus allowing contemporary the further treatment of the synthesised gas and the recovery of mineral and metallic molten granulates.

12 Claims, 2 Drawing Sheets

METHOD FOR THE RECYCLING OF MUNICIPAL SOLID WASTES

Figure 1:
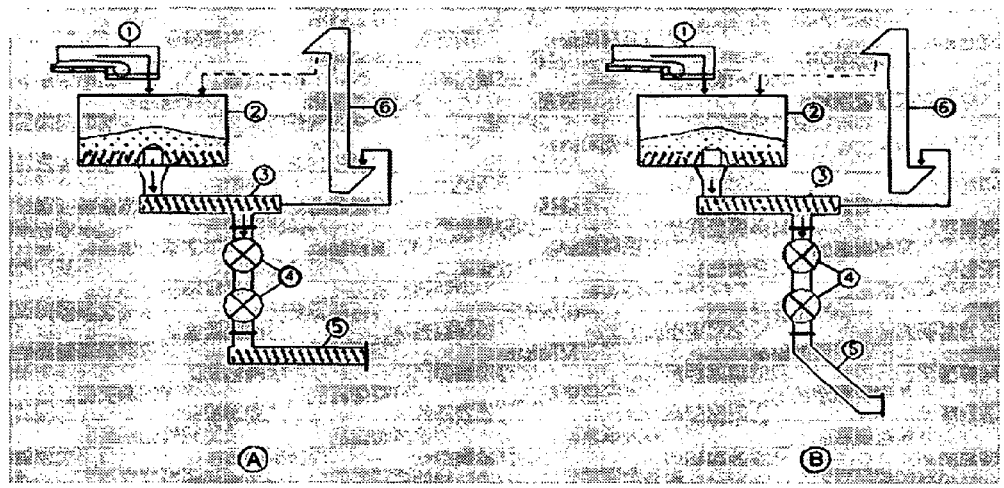

This application is a national phase application under 35 U.S.C. §371 of PCT International Application No. PCT/EP2005/009052, filed Jun. 17, 2005, which claims priority to Italian Patent Application No. RM2004A000297, filed Jun. 17, 2004.

TECHNICAL FIELD

The present invention relates to a method and a system for the complete recycling of municipal solid wastes with minimal environmental impact and with the use of the wasted solid recovery fuel (WSRF) for the production of electric energy and/or hydrogen.

BACKGROUND OF THE INVENTION

The term waste is intended to mean all products that are no longer of use and which are to be disposed and any substance derived from human activities or natural cycles that is abandoned or destined to be abandoned. Municipal solid waste treatment and recycling systems have been studied for a long time, due to the always growing necessity of an effective, environment-friendly disposal and of a functional use of the waste as an energy source.

According to those necessities, a first object of the present invention is to find a method which allows the maximum recovery of the waste products; a further object of the present invention is to provide a process for the use of the Wasted solid recovery fuel (WSRF) with consequent energy recovery with a minimal environmental impact; still a further object of the present invention is to provide a suitable system for the achievement of a cost-effective and energy-exploiting recycling process.

DISCLOSURE OF THE INVENTION

According to the present invention the total recovery procedure of the materials classified as urban solid waste, is obtained using a method according to claim 1 and a system according to claim 1.

Further advantages are disclosed in the dependent claims.

In particular, the method provided by the present invention is characterised by the following steps:
receiving of the M.S.W.,
mechanical sorting of the dry and wet fractions,
treatment of the dry fraction and preparation of the WSRF,
recovery of the metals,
treatment of the wet fraction,
refining of the stabilized organic fraction,
volume reduction of the bulky materials,
process air treatment
gasification of the WSRF in a reactor with at least one combustion chamber,
production of electric energy from the gas derived from the process and/or production of hydrogen.

It must be pointed out that all operations connected with the various procedures are undertaken inside industrial plants provided with suitable flooring, that is closed and shows a forced ventilation system that is in continuous operation and which keeps the entire interior environment in a condition of slight reduction in pressure. This ventilation system focuses on a centralized purification system, which ensures the abatement of dust and odour.

Receiving the Municipal Solid Waste

The self-compacting devices, which supply the waste to the system after the weighing process, are sent to the incoming section for unloading.

Access to this section by the self-compactors occurs by means of large doors complete with automatic shutters, which remain open only for the time necessary for vehicle transit. After the waste is unloaded, it is conveyed to the mechanical sorting line, onto which the waste is loaded using electro-hydraulic cranes with crab bucket, which serves to supply the production lines, and also undertakes to remove any bulky materials which are crushed and reduced in size on the special operating line.

Mechanical Sorting of the Dry and Wet Fractions

The system is provided with one or more sorting lines having capacity of up to 100 t/h each. The waste, loaded onto the line, undergoes the first treatment stage that consists in the splitting of the packaging in which the waste was originally collected, followed by a size-sorting stage. A low-speed tearing device acts to split the packing and the sacks, to free the contents without having any excessive abrasive or crushing action, which would serve to annul the various features that characterize the various types of products, thereby reducing the mechanical sorting process efficiency.

The subsequent mechanical sorting of the dry and wet fractions occurs through the screening grates of rotating trommels with self-cleaning device.

This rotating separator is equipped with meshes of adequate size to separate the following materials:
dry component consisting of materials with a high calorific value (paper, plastics, cloths, rubber etc)
wet component mainly consisting of coarse organic substances (usually still mixed with glass, stones etc).

Dry Fraction Treatment and Preparation of the WSRF

The treatment of the dry fraction, firstly undergoes the removal of the metallic components, in which every kind of metallic element is removed, before undergoing a special sizing process, by means of a special shredder equipped with a particular kind of extendable grating, connected to a wind shifting system with subsequent cleaning and quality enhancement system. The combined action of these devices results in the production of Wasted Solid recovered Fuel. The WSRF is then conveyed to two stationary compactors for direct loading, in fluff form, to tractors and semi-trailers for transportation to the thermo-exploitation plant. In parallel, there is also a packaging line which forms the material into bales and shrink-warps them with stretch film for the eventual provisional storage of the WSRF during the planned maintenance intervals of thermo-exploitation system.

Metal Recovery

The iron and aluminium are respectively separated by electro-magnetic action, i.e. under the action of the inducted current flows. The ferrous materials are purified in a special line and converted into "PROLER". The aluminium is packed into bales. Subsequently both recycled products are sent to the respective production industries to be reused.

Aerobic Treatment of the Wet Fraction

The operation consists in a bio-oxidation reaction based on a process which takes places in aerobic digesters on maturation basins, consisting of rectangular tanks, parallel or series mounted, with a standard width of 22 metres and of variable length of up to over 150 metres, as a function to the daily output. In both those digesters with parallel positioned tanks and those with tanks positioned in series, the process is of sufficient duration to ensure the maturation and the total biological stabilization of the organic substances. During this stage, the biomass is subject to an intense accelerated reaction, during which intense biological activity takes place that promotes the rapid decomposition of the biodegradable substances. The tanks are installed in completely segregated areas of the system. The Bio-oxidation reaction of the biomasses inside the tanks on a layer approx. 3 metre thick, is controlled and maintained fully aerobic by means of the forced ventilation and timed mechanical overturning. The ventilation system comprises a capillary distribution network so as to ensure process uniformity and avoiding the possible formation of any aerobic sacks.

The overturning operation, carried out by special bridges equipped with screw augers, ensures the maintenance of the material porosity, avoiding the formation of any preferential channels, which would otherwise result in process anomalies.

The aerobic treatment comprises, in synthesis, the following stages and procedural-times:
  accelerated decomposition of the organic substances for 2-3 weeks,
  separation of the inert processing residues from the biomass and
  maturation and stabilization of the organic fraction for 5-6 weeks.

All operations, including material loading and unloading, are automatically carried out and do not require any intervention from the personnel.

Refining of the Stabilized Bio-Waste (or Organic Fraction).

At the end of the aerobic treatment processes, the digested and stabilized organic component is conveyed to the final mechanical refining line in order to purify it of all inert fragments such as glass, stones, plastics, etc.

This line also undertakes further recovery of WSRF from the processing residues. This operation is also automatic and, at the end of the operation, the processing residues, the WSRF and the stabilized biowaste (grey compost) are obtained with a dynamic respiration index (DRI) suitable for use in operations of ecological restoration.

Volume Reduction of Bulky Materials

The treatment of the bulky materials consists in a very forced grinding operation that, by means of material crushing, succeeds in effectively reducing the volume whilst assuring the recovery of any ferrous materials.

The crushed material is loaded into special containers for final destination which may be a thermo-exploitation plant, in the event of suitably combustible materials, or to a plant servicing dump.

Process Air Treatment

This process foresees that every working stage is maintained in slight negative pressure conditions by sucking air; said sucked air is then sent to the combustion cycles of the WSRF. The sucked air passes through a bio-filter that guarantees the best possible results in terms of yield and odour abatement. This filter consists of a bed of suitably treated biomasses, with a high degree of porosity and extended biologically active surfaces that ensures the best possible results in terms of yield and odour abatement. The forced air intake of the abatement system is through a series of centrifugal fans. The use of closed conveyor belts and dust exhaust hoods on the machines helps to reduce the amount of dust released into the working environment and consequently the amounts of air to be treated. The organic material aerobic treatment basins, where odour emission is greater, are enclosed in completely segregated areas, constantly kept under vacuum (day and night) to prevent any air escape.

The second object of the present invention is the energy exploitation of the WSRF through gasification and consequent use of the synthesis gas for the production of electric energy and/or hydrogen. The innovative aspect of the process consists in the gasification of the WSRF, which is supplied with continuous and homogeneous flow, together with melting and vitrifying action on the ashes present in the same, classified as inert material, and the production of electric energy through a combined high-efficiency cycle system, using the synthesis gas derived from the gasification process.

The WSRF is subjected to high-temperature gasification and the energy necessary for the gasification reactions inside the reactor is produced by means of oxygen and fuel burners. If the gasification system is located in a waste dump area, the majority of WSRF sorting and production systems being in fact within the vicinity of the dump, the fuel used for the burners will be the biogas recovered from the anaerobic digestion process of the deposited biowaste of the dump itself.

The synthesis gases derived from gasification undergo a forced cleaning process so that they can be used in high efficiency combined energy cycles such as:
  Endothermic engines with recovery boiler and steam cycle through a turbo-alternator
  Gas turbines with steam cycle recovery boiler with thermo-alternator
  Fuel cells
  Turbogas thermal generating stations This technique is very different from the traditional WSRF energy exploitation systems, as the recovery of the energy contained in the WSRF, in processes involving grid furnaces or boilers and/or fluid-bed furnaces or boilers, occurs through transformation of the direct thermal energy contained in the hot fumes generated by the combustion process into high-pressure steam, which is expanded in an electricity-producing turbine. Furthermore, the solids from traditional combustion processes, consisting of slag, ashes and filtration powders, are normally non-reclaimable products.

On the contrary, in the gasification process proposed here, the inorganic compounds present in the WSRF are converted, by means of a high-temperature melting process, into recyclable mineral substances (vitrified mineral granulate and metallic granulate), while the sulphur compounds ($H_2S$, $CS_2$, COS) present in the synthesis gas are eliminated, thereby recovering the sulphur. Finally the rapid cooling process (in only a few milliseconds) of the synthesis gas avoids the re-formation of any dioxin and furan compounds, what occurs in the traditional waste combustion processes as the result of the cooling of the fumes inside the boiler within a temperature delta of 250° and 300°.

A further object of the present invention is to provide a system for the achievement of the above-described method. It has been found that the system matching optimally the need of optimising the recycling of municipal solid waste, with minimal environmental impact and use of the wasted solid recovery fuel comprises:
  a system for the continuous and homogeneous feeding (A, B) of WSRF,
  a gasification reactor (8) with at least one combustion chamber,
  a granulate collection tank (13),
  an outgoing conduct (15) of the gasification reactor (8),
  a section for the water quenching (16, 17),
  a section for the acid washing (18),
  a section for the basic washing (19, 20),
  a section for the initial elimination of sulfidric acid (21),
  a section for the elimination of fine particulate (22),
  a catalyst for the elimination of the organic compounds of Sulphur (27),
  a section for the elimination of the residual sulfidric acid (28), a system of combined cycles for the production of electric energy and/or a system for the production of hydrogen.

DETAILED DESCRIPTION OF THE DRAWINGS

Figure 2:
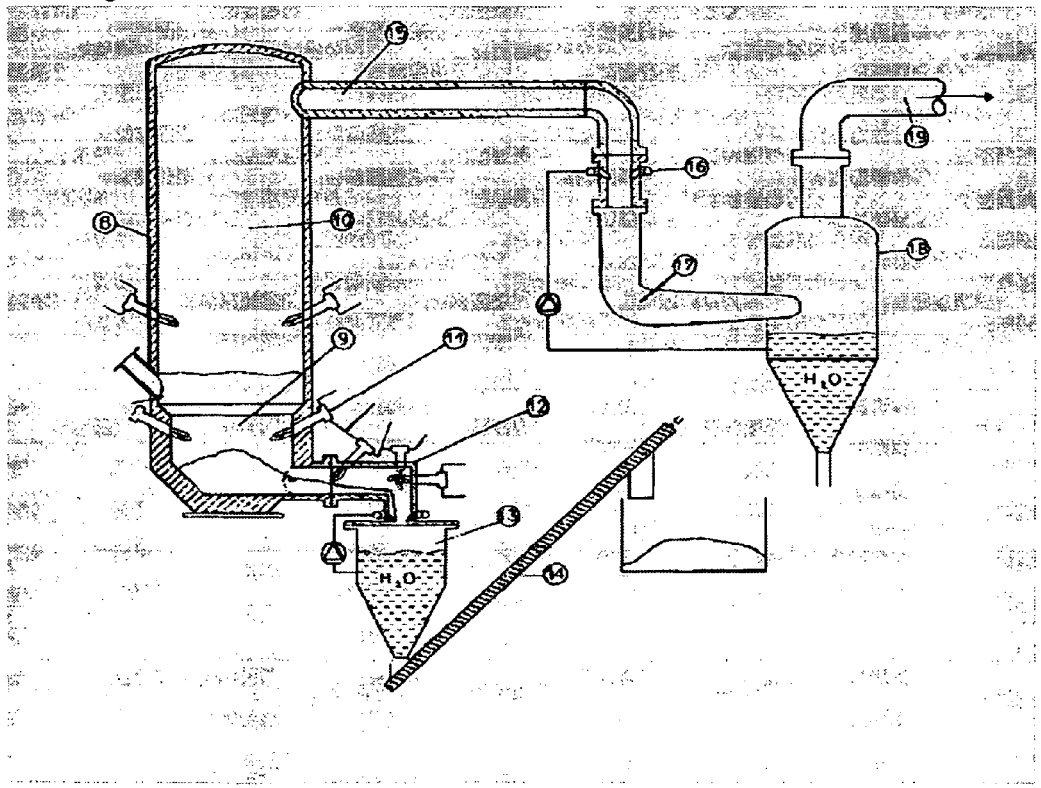
Figure 3:
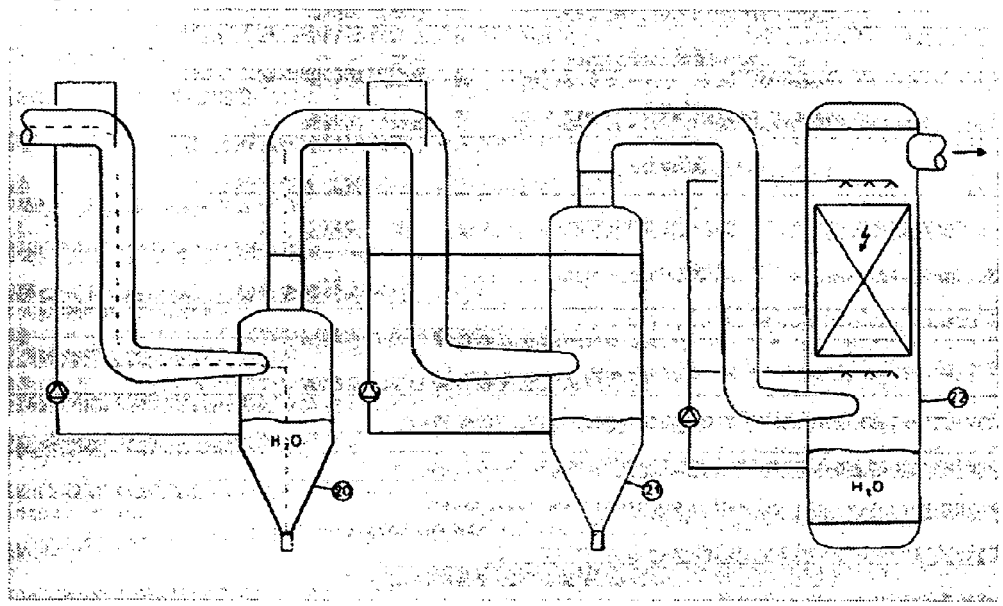
Figure 4:
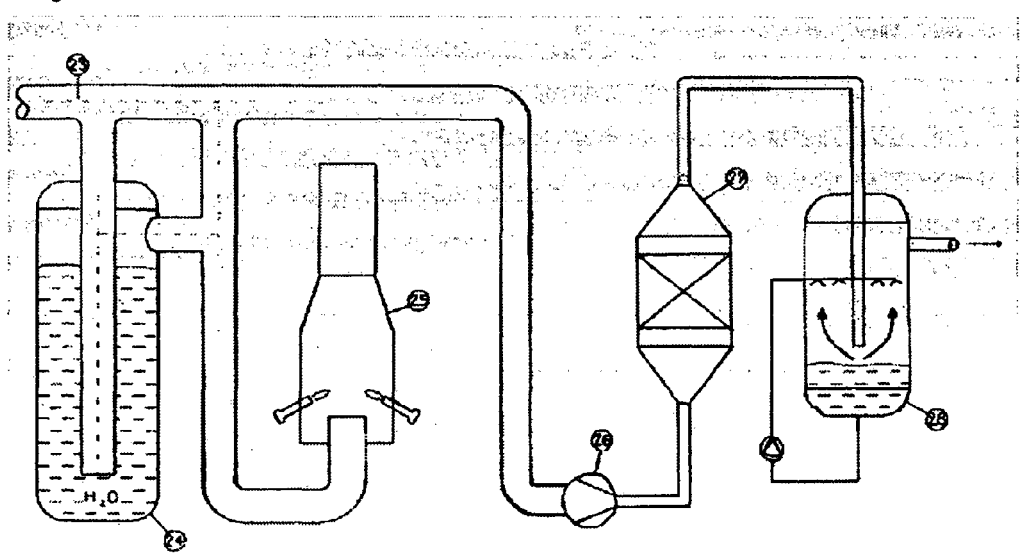

For a better comprehension of the method and system features, a detailed description of both the process and the system will now be provided with reference to the enclosed drawings in which:

FIG. 1A: shows a diagram of a screw feeder system
FIG. 1B: shows a diagram of a slope feeder system
FIG. 2: shows a diagram of the gasification reactor
FIG. 3: shows a diagram of the washing and filtering systems
FIG. 4: shows a diagram of emergency flare, catalyst and washing process.

WSRF Supply System

As WSRF is a homogeneous fuel, both in terms of its sizing and chemical-physical features, the process does not require any pre-treatment, so that the fuel is supplied in the "fluff" form, without any additional extrusion and/or pellet preparation treatments, as is the case in other gasification treatments.

The means of conveyance of the WSRF into the gasification reactor 8 has a particularly innovative feature of making use of a technique to permit the continuous and homogeneous flow of the fuel into the reactor.

The continuous supply process allows, owing to a homogeneous fuel such as WSRF, to get stable gasification and a constant production rate of synthesis gas in ratio to the volume and calorific value of the gas itself.

The system for continuous feeding of WSRF into the reactor 8, shown in two different versions A, B in FIG. 1, consists of:

a WSRF storage silo
conveyance system (1) of the WSRF from the storage silo to a dosing receiver (2)
a conveyance system (3) of the WSRF from the dosing receiver (2) to an inlet system (5) into the gasification reactor (8)
a double sealing system (4) with valves
an inertisation system with Nitrogen,
a conveyance system (5) for feeding the WSRF into the gasification reactor (8)
an excessive capacity recovery system (6)

The WSRF is fed, as shown in FIG. 2, to the high-temperature reactor 8 by means of the feeder system 5 which can be a cooled screw feeder or a slope. The reducing environment inside the gasification reactor 8 is maintained at a high temperature thanks to thermal energy generated by the burners 11, powered by oxygen and biogas (or natural gas or LPG), thereby permitting gasification to take place. The volatile components in the WSRF are instantly gassed, while the less volatile carbonious part is deposited on the lower part 9 of the reactor 8 to be subsequently gassed. Thanks to a sufficiently long reaction time inside the reactor (<2 seconds), the macromolecular components present in the synthesis gas are converted, in the upper part of the reactor 10, into simple molecules ($H_2$, CO, $CH_4$, $CO_2$, $H_2O$) thereby ensuring a thermodynamic equilibrium. Thanks to the large cross-section area of the reactor, the synthesis gases, generated by gasification, takes on an ascending speed, diminishing from the centre of the reactor towards the walls of the same, of between 2 and 4 m/s, thereby avoiding the mass conveyance of the carbon and melted mineral particulate matter towards the reactor outlet.

By means the over-stoichiometric controlled addition of oxygen both in the lower and upper zones of the high-temperature reactor, and thanks to the exothermic reactions thereby created, the gas outlet temperature 15 reaches 1100° C. In order to avoid the melting of the ashes conveyed by the ascending flow of the synthesis gas that, because of its own condensation, would cause the clogging of the system section immediately before the quench 16, temperatures higher than 1200° C. are avoided.

A series of burners installed at the reactor upper section 10, above the supply system, give the synthesis gas a slight turbulence, optimising the temperature homogenisation. Such homogenisation prevents the risk of formation of any colder ascending currents (<800° C.) which would cause the creation of long molecular chains such as those of tars.

In the lower part 9 of the reactor 8, where the average temperature is comprised between 1500 and 1700° C. and more particularly is about 1600° C., the inorganic components of the WSRF, which are the metallic and mineral matters, melt. The molten mass is collected by gravity into the melting crucible 9. This is held at working temperature through the addition of biogas (or either Neutral Gas or LPG) and pure oxygen, and with adequate period of permanence, the blending of the molten masses is thereby obtained.

A series of burners positioned horizontally in the radial launder trough of the melting crucible 9, provide the thermal energy needed to maintain the inorganic material, such as the minerals and metals originally contained in the WSRF, in liquid state, thereby ensuring a constant level inside the melting crucible. Secondarily, the gas flow created by the above mentioned burners, generate a kind of kinetic impulse sufficient to prevent the risk of accidental conveyance of any unburnt WSRF inside the inlet trough direct to the launder trough of the crucible 9. The molten mass enters through a channel 12 the granulate storage tank 13 where, due to water quenching, it solidifies thereby giving rise to a vitrified and metallic non-leachable mineral granulate.

There are also a series of burners, vertically installed at outlet from the crucible launder trough, which means that the thermal energy generated is thereby able to smelt any eventual materials solidified as the result of the cooling of the same, caused by the ascending water vapour from the collection tank and the water-powered mineral and metallic granulate crushing device.

In order to avoid any synthesis gas flowing out from the gasification reactor towards the exterior through the launder trough of the melting crucible 9, the mineral and metallic granulate collection tank 13 is directly connected to it.

Vitrified Non-Leachable Mineral Granulate and Metallic Granulate

Approx. 7% by weight of the WSRF quantity introduced into the gasification system is returned in the form of inert vitrified mineral granulate and metallic granulate. The University of Rome has conducted various transfer tests and relative analyses on a sample of vitrified mineral granulate, in order to verify its composition. The results are shown in table 1 below:

TABLE No. 1

Concentration limits in the eluate for inert refuse dump.

| Component | mg/l |
|---|---|
| AS | 0.05 |
| Ba | 2 |
| Cd | 0.004 |
| Cr | 0.05 |
| Cu | 0.2 |
| Hg | 0.001 |
| Mc | 0.05 |

TABLE No. 1-continued

Concentration limits in the eluate for inert refuse dump.

| Component | mg/l |
|---|---|
| Ni | 0.04 |
| Pb | 0.05 |
| Sb | 0.006 |
| Se | 0.01 |
| Zn | 0.04 |
| Chlorides | 80 |
| Fluorides | 1 |
| Sulphates | 100 |
| Phenol index | 0.1 |
| DOC | 50 |
| TDS* | 400 |

*It is possible to use the TDS (Total dissolved solids) index as an alternative to the values for sulphate and chloride.

Based on these analyses, the vitrified mineral granulates can also be used in the following applications:
- concrete additive, as a substitute for gravel
- road construction
- landscaping
- replacement of natural stones
- used as sandblasting material while the metallic granulate can be sent for foundry reclaiming.

Quenching and Purification of Synthesis Gas

In this part of the system, as shown in FIG. 2, the synthesis gas is cooled and purified. All undesirable chemical substances and organic residue are removed by the synthesis gas, so to facilitate its recycling. The synthesis gas flowing out from the upper 15 part of the high temperature reactor 8 undergoes the following stages:
- quenching with water (16, 17)
- acid washing (18)
- basic washing (19, 20)
- initial elimination of sulfidric acid (21)
- elimination of fine particulate by means of wet electro-filter (22)
- catalysis for the elimination of the organic compounds of Sulphur (27)
- elimination of the residual sulfidric acid (28)

Quenching with Water

The coarse synthesis gas leaves the reactor at a temperature between 800 and 1200° C. and more precisely at approx. 1100° C. and is cooled in the quench stage 16, by means of water, until it falls to a temperature of 90-95° C. This sudden cooling, serves to "freeze" the thermodynamic balance caused by the high-temperature reactor thereby avoiding the re-formation of dioxins and furans. The special characteristic of this rapid cooling process, as previously described, consists in the absence of technical appliances such as heat exchangers and other devices usually used for fluid cooling.

The thermal energy required for the cooling process proceeds from evaporation of the water used in the quench circuit.

The quantity of evaporated water is reintegrated by the last stage of process water treatment which, in turn, is almost totally destined for the treatment of condensate in the alkaline leaching stage.

Synthesis Gas Treatment

The gas cooled by evaporation in the quench stage 16 is submitted to acid scrubbing stage 18 in which a further treatment is undertaken. The presence of chloride and fluorine in the WSRF gives rise to the formation of HCl and HF in the high-temperature reactor. These components are dissolved in the aqueous quench stage giving rise to a highly acidic pH value.

Thanks to the treatment at pH<3, the volatile heavy metals contained in the coarse synthesis gas are dissolved in the form of chlorides and fluorides and are thereby eliminated from the synthesis gas. Further chemical substances that cause the formation of acids such as $H_2S$, $SO_2$, and $CO_2$ continue to remain in a gaseous state and move on to the subsequent treatment stages. The quench water and the liquid used in acid scrubbing, operating in a closed loop, are de-gassed before being sent for a sedimentation and filtering process, which acts to separate the solid matter.

The purified washing liquid is sent to the quench through the pumps in the circuit, after cooling in a heat exchanger.

In the alkaline washing stage 20 the liquid droplets, from the previous acid treatment stage, conveyed by the synthesis gas flow, are then neutralized. For this purpose, the pH value of the washing fluid is maintained at a level of between 7-7.5 by the addition of NaOH. The excess of water, resulting from the condensation of the humidity present in the WSRF as well as from water evaporation, generated by the cooling process, which is flowing out from the quench stage, is sent to the chemical-physical system for process water treatment.

Through the breakdown of trivalent iron into bivalent iron and subsequent re-oxidation as the result of the input of air in the regeneration stage, the hydrogen sulphide is dissociated into elementary sulphur and hydrogen. The elimination of $H_2S$ occurs during the de-sulphuring treatment stage 21 during which the contact between the synthesis gas and the liquid solution is ensured by the capillary emission of liquid into the washer.

The oxidation of the bivalent iron and the subsequent regeneration of the de-sulphuring liquid, as well as the separation of the elementary sulphur, occur during the regeneration stage. After sedimentation, the sulphur is dehydrated in a filter-press and eliminated from the process.

After the de-sulphuring stage, the gas is treated in a wet electrostatic filter (EFU) 22 at the same temperature as the previous stage. The electro-physical process in this treatment stage permits the elimination of the volatile particulates and of the aerosols still present in the synthesis gas. The system also foresees the re-circulation in a semi-closed water circuit, thereby conveying part of the contaminated water to the oxidation stage and the re-integration of the clean water from the evaporation stage, and the crystallization of the process-water treating system.

Hydraulic Guard and Emergency Flare

Both the high-temperature reactor and the synthesis gas treatment stages operate in a slight over-pressure condition (up to 450 bar), thereby avoiding the penetration of the oxygen present in the air and the resulting formation of explosive gas mixtures.

The main pipe 23 of the synthesis gas treatment section, as shown in FIG. 3, is connected to a Hydraulic guard 24 which acts as a safety valve. In the event of any sudden pressure increase over the security limits, the synthesis gas is conveyed through the hydraulic guard directly to the safety flare 25, which provides for its combustion. The emergency flare 25 is an important safety element as, in the event of any system faults, the gasification process cannot be suddenly interrupted and the gas must in any case be disposed of in a safe manner.

Process Water Treatment

The process water principally consists of water vapour condensed in the gas treatment stages, which partly comes from the humidity present in the WSRF, and partly resulting from the gasification and combustion processes.

The purification of the process water originating from the acid-basic treatment of the synthesis gas occurs in this unit. The condensate flow contains both metals and salts.

The main phases of the chemical-physical process are:
Oxidation
Precipitation
Sedimentation
Neutralization
Evaporation and crystallisation The treatment end-products are:
Concentrate of metal hydroxides and carbon residues
Mixed salt The process water evaporated in the last treatment stage, after condensation, is used in the cooling circuit of the evaporation towers, thereby ensuring that the system is free of refluent fluids. The process water flowing out from the basic washing treatment stage is then sent to the oxidation tanks. It is oxidized through the addition of hydrogen peroxide so that the hydrogen sulphide dissolved in water is thereby transformed into dissolved sulphur, thus avoiding the escape of hydrogen sulphide gas in the subsequent treatment stages. At the same time, the bivalent iron is transformed into trivalent iron to improve the precipitation conditions. The agitators ensure an intense mixing action during the oxidation stage. After oxidation of the liquid from the basic washing treatment, the carbon sedimentation sludge and the clear water from the primary quenching circuit are conveyed to the storage tanks of the condensate produced during all the gas treatment stages during the cooling process. This storage area permits to normalize the liquid flow to the subsequent treatment stages.

The assumed pH value ranging from 8.5 to 9.0 is regulated by the addition of caustic soda so that the heavy metal hydroxides can be separated. The addition of $CO_2$ through porous membranes permits the precipitation of the water dissolved calcium in the form of calcium carbonate. The sludge composed of carbon particles, calcium carbonate and metal hydroxides, is sent for the subsequent storage and dehydration stage, while in the clear aqueous stage it is pumped to the neutralization system. Hydrochloric acid is added so that the process water derived from the precipitation is neutralized before being sent to the subsequent ion exchanger. The neutralization stage permits the crystallization in the evaporation stage, in the form of salt, of both sodium chloride and ammonium chloride, which otherwise, due to the basic pH working values, would evaporate with the water.

Two alternatively operated cation exchangers convey the residues of calcium, zinc and other metals. Whilst one of the modules is operating, the other is regenerated. During the regeneration process, the metallic ions retained are replaced by sodium ions, which are in turn transferred to the water during the operating stage in order to withhold the metallic ions. The salts are crystallized in the evaporation system. The water vapour produced, after condensation, is sent to the cooling circuit to partially compensate for the reintegration water required for the operating of the evaporation towers. The crystalline aqueous solution is treated by a centrifugal machine to remove the salt crystals. This process does not generate any wastewater and is therefore free of any refluent fluid.

The water from the WSRF can only partially meet the needs of the evaporation cooling circuit, especially in the summer months. It is therefore necessary to connect up with the industrial mains for cooling purposes and to the drinking water mains for sanitary purposes. Alternatively, under certain territorial conditions, a liquid waste (i.e. sump percolation) treatment section might be integrated in the gasification system, contributed by third parties, in order to recycle the treated process water and make savings on the water resource.

Oxygen Production System

The air fractionating system generates pure oxygen, nitrogen and compressed air. The oxygen is used in the thermal process, nitrogen for the rendering the various elements of the system inert, during the repair and maintenance operations, while the compressed air is used for the control of regulation and closing elements. In certain cases, the air fractionating system is not an integral part of the gasification system; the oxygen necessary for the gasification process being supplied through low-pressure piping from an external system positioned in the vicinity and intended for the production of engineering oxygen for various industrial uses.

Electric Power Production

The purified synthesis gas may be conveyed to the following systems for the exploitation of its power potential:
  gas turbines, after one or more compression stages; in combination with a cycle combined with a steam turbine for the production of solely electrical power, or through a co-generative cycle in the production of steam and/or hot water
  gas motors in combination with a co-generating cycle for the production of electric power, steam and/or hot water
  combustible cells with melted carbonates or running on solid oxides for the production of electric energy in combination with a re-generative cycle for the production of steam and/or hot water, or through heat pump, for cold energy.

The synthesis gas may also be used as gaseous fuel and used for:
  industrial boilers;
  thermoelectric power plants, even of "turbogas" type;
  industrial furnaces.

The forced purification process of the synthesis gas, as provided by the present process, ensures, during its combustion for the production of thermal and electric energy, the compliance with the regulations relative to macro-pollutant atmospheric emissions, such as acid gases (HCl, HF), sulphur oxides and material in particulate form, while it excludes the presence of organic-chlorinated compounds such as dioxins and furans.

Thanks to the gasification system of the present invention which shows a reduced environmental impact, the WSRF can ideally be used in a system that ensures the benefits as repeatedly stated, providing a reliable response and an advanced technical solution as it ensures the maximum recovery of the resources contained in the waste, whilst at the same time limiting the environmental impact to a minimum, as it:
  reduces the percentage of residues to be sent for final storage to a minimum rate of 20-25% by weight of the actual treated waste;
  ensures maximum recovery and recycling of metals (iron, aluminium, metallic granulates) as well as of materials intended for the building sector (mineral granulate) and environmental recuperation
  reduces environmental impact in terms of macro and micro air-polluting emissions
  permits rational use of water resources ensures that the processing residues are rendered completely inert and stabilized, ready to be sent for final storage.

The invention claimed is:

1. Method for the recycling of Municipal Solid Waste (M.S.W.), with minimal environmental impact and use of the Wasted Solid Recovered Fuel (W.S.R.F.), comprising the following steps:
  receiving M.S.W.,
  mechanical sorting of dry and wet fractions,
  treating the dry fraction and preparation of WSRF, recovering metals,
treating the wet fraction,
refining a stabilized organic fraction,
reducing the volume of bulky materials,
treating process air
gasifying the WSRF in a reactor with at least one combustion chamber,
producing electric energy from gas derived from the process and/or producing hydrogen
wherein the gasification of the WSRF comprises the steps of
feeding continuously and homogeneously the WSRF into a reactor (8) with at least one combustion chamber,
gasifying the WSRF by means of oxygen-biogas-burners,
cleaning of the obtained gas,
converting, by melting, the inorganic components present in the WSRF into vitrified non-leachable mineral and metallic granulate,
wherein the biogas used by the burners derives from the process of anaerobic digestion of the organic fraction.

2. Method according to claim 1,
characterised in that the receiving of the municipal solid waste is performed using a feeder line with mechanical sorting device, which, after weighing, removes any bulky materials.

3. Method according to claim 1,
characterised in that the mechanical sorting of the dry and wet fractions occurs through screening grates of rotating trommels with self-cleaning device, after performing plastic refuse bags-opening by means of slow-rotation bag-splitters.

4. Method according to claim 1,
characterised in that the treatment of the dry fraction and preparation of the WSRF comprises the following steps:
removing metallic items
sizing by means of a shredder with extendable grating
wind sifting,
cleaning and quality enhancement.

5. Method according to claim 1,
characterized in that the recovery of the metals occurs by electromagnetic and eddy currents actions.

6. Method according to claim 1,
characterised in that the treatment of the wet fraction is an aerobic treatment comprising a bio-oxidation comprising the steps of:
accelerated decomposing of the organic substances for 2-3 weeks,
separating the inert processing residues from the biomass and
maturing and stabilising the organic fraction for 5-6 weeks,
wherein said bio-oxidation is maintained aerobic by means of forced aeration and mechanical overturning.

7. Method according to claim 6, wherein:
the forced aeration occurs by means of a capillary air distribution network, while the mechanical overturning is achieved by screw augers;
the refining of the stabilized organic fraction is achieved on a mechanic line where inert fragments are rejected and WSRF, comprising plastic fragments, and stabilised organic fraction are obtained;
the volume reduction of the bulky materials occurs by shredding and contemporary recovery of ferrous materials;
the process air treatment comprises the steps of:
a) suctioning of air from every process stage and maintenance of negative-pressure conditions,
b) sending part of said suctioned air to the combustion cycles of the WSRF and the rest to an air treatment system.

8. Method according to claim 1,
wherein additionally
the reactor and the gas treatment stages operate in a slight over-pressure condition wherein the pressure is up to 450 bar;
a carbonious fraction of the WSRF falls into a crucible (9) in the lower part of the reactor (8), where the temperature is comprised between 1500 and 1700° C., said carbonious fraction being gasified after the volatile fraction,
the temperature of the gasses exiting the reactor (8) is comprised between 800 and 1200° C. (15),
a series of burners in the upper part (10) of the reactor (8), above the WSRF feeding system, impress a slight turbulence which optimises the temperature homogenisation,
the crucible (9) is maintained at working temperature by means of biogas and oxygen fed by burners (11).

9. Method according to claim 1,
characterised in that the gas coming from the upper part (10) of the reactor (8) undergoes the following stages:
quenching with water (16, 17)
acid washing (18)
basic washing (19, 20)
initial eliminating of sulfidric acid (21)
eliminating fine particulate by means of wet electrostatic filter (22)
catalysing the elimination of the organic compounds of Sulphur (27)
eliminating the residual sulfidric acid (28).

10. Method according to claim 9, wherein:
in the quench stage (16, 17) the gas produced is cooled at a temperature comprised between 90 and 95° C.;
in the acid washing stage (18) the pH is <3;
in the basic washing stage (19, 20) the pH is comprised between 7 and 7.5.

11. Method according to claim 1,
wherein the production of hydrogen comprises the steps:
cleaning up CO by two stages water gas shift catalyst reaction,
purifying by means of membranes separation and pressure swing adsorption.

12. The method according to claim 8,
wherein the temperature of the crucible is 1600° C., and the temperature of the gasses exiting the reactor (8) is 1100° C.

* * * * *